United States Patent
Inoue et al.

(10) Patent No.: US 9,706,782 B2
(45) Date of Patent: Jul. 18, 2017

(54) SHOULDER-BLADE INCISION-MAKING APPARATUS

(71) Applicant: MAYEKAWA MFG. CO., LTD., Tokyo (JP)

(72) Inventors: Noriyuki Inoue, Tokyo (JP); Shinji Hane, Tokyo (JP); Kenichi Oka, Tokyo (JP); Koji Takanashi, Tokyo (JP); Naoki Toyoda, Tokyo (JP); Hiroyuki Sakurayama, Tokyo (JP); Noriyuki Takahashi, Tokyo (JP)

(73) Assignee: MAYEKAWA MFG. CO., LTD., Tokyo (JP)

( * ) Notice: Subject to any disclaimer, the term of this patent is extended or adjusted under 35 U.S.C. 154(b) by 0 days.

(21) Appl. No.: 15/322,728

(22) PCT Filed: Jun. 25, 2015

(86) PCT No.: PCT/JP2015/068359
§ 371 (c)(1),
(2) Date: Dec. 29, 2016

(87) PCT Pub. No.: WO2016/002629
PCT Pub. Date: Jan. 7, 2016

(65) Prior Publication Data
US 2017/0119002 A1    May 4, 2017

(30) Foreign Application Priority Data

Jun. 30, 2014 (JP) .................................. 2014-134086
Jun. 30, 2014 (JP) .................................. 2014-134087
Jun. 30, 2014 (JP) .................................. 2014-134088

(51) Int. Cl.
*A22C 21/00* (2006.01)

(52) U.S. Cl.
CPC ...... *A22C 21/0069* (2013.01); *A22C 21/0046* (2013.01)

(58) Field of Classification Search
CPC ................ A22C 21/00; A22C 21/0023; A22C 21/21003; A22C 21/0046
(Continued)

(56) References Cited

U.S. PATENT DOCUMENTS 5,312,291 A    5/1994    van den Nieuwelaar et al.
5,314,374 A    5/1994    Koch et al.
(Continued)

FOREIGN PATENT DOCUMENTS

JP    H067074      1/1994
JP    H11266780    10/1999
(Continued)

OTHER PUBLICATIONS

"International Search Report (Form PCT/ISA/210) of PCT/JP2015/068359", mailed on Oct. 6, 2015, with English translation thereof, pp. 1-2.
(Continued)

*Primary Examiner* — Richard Price, Jr.
(74) *Attorney, Agent, or Firm* — Jianq Chyun IP Office (57) ABSTRACT

A shoulder-blade incision-making apparatus is provided and includes: a fixing jig on which the poultry carcass which is eviscerated and which has leg parts removed is to be placed and fixed; a fixing jig conveyer forming a conveyance path of the fixing jig and convey the fixing jig along the conveyance path; a first separating member disposed above the conveyance path movably upward and downward; and a first driving device for moving the first separating member in an upward and downward direction. The first driving device is operated to move downward the first separating member and move the first separating member along a surface of the (Continued)

shoulder blade of the poultry carcass in accordance with a timing when the poultry carcass fixed to the fixing jig reaches a meat-separation position below the first separating member, therefore the meat portion attached to the shoulder blade is separated from the shoulder blade.

8 Claims, 8 Drawing Sheets

(58) Field of Classification Search
USPC ........ 452/135, 136, 149, 150–152, 155–157, 452/160, 161
See application file for complete search history.

(56) References Cited

U.S. PATENT DOCUMENTS

| | | | | |
|---|---|---|---|---|
| 5,372,538 | A | * | 12/1994 | Ketels .................. A22B 5/0052 30/388 |
| 5,954,574 | A | | 9/1999 | Verrijp et al. |
| 6,059,648 | A | | 5/2000 | Kodama et al. |
| 6,935,942 | B1 | | 8/2005 | Evers et al. |
| 8,992,290 | B2 | * | 3/2015 | Taniguchi ............ A22C 17/004 452/135 |
| 9,033,774 | B2 | * | 5/2015 | Taniguchi ............ A22C 17/004 452/136 |
| 2006/0270331 | A1 | | 11/2006 | Fujiwara et al. |
| 2009/0275275 | A1 | | 11/2009 | Evers |
| 2012/0231716 | A1 | | 9/2012 | Janssen et al. |

FOREIGN PATENT DOCUMENTS

| | | |
|---|---|---|
| JP | 2002527088 | 8/2002 |
| JP | 2010501169 | 1/2010 |
| JP | 2011125317 | 6/2011 |
| JP | 2011177096 | 9/2011 |
| JP | 2012249599 | 12/2012 |
| JP | 2013046632 | 3/2013 |
| WO | 2004052107 | 6/2004 |

OTHER PUBLICATIONS

"International Preliminary Report on Patentability" issued to PCT/JP2015/068358, mailed on Jan. 3, 2017, with English translation thereof, pp. 1-17.

"International Preliminary Report on Patentability" issued to PCT/JP2015/068359, mailed on Jan. 3, 2017, with English translation thereof, pp. 1-18.

"International Preliminary Report on Patentability" issued to PCT/JP2015/068360, mailed on Jan. 3, 2017, with English translation thereof, pp. 1-16.

"International Preliminary Report on Patentability" issued to PCT/JP2015/068361, Jan. 3, 2017, with English translation thereof, pp. 1-17.

* cited by examiner

FIG. 2

A-A CROSS SECTION

SHOULDER-BLADE INCISION-MAKING APPARATUS

CROSS-REFERENCE TO RELATED APPLICATION

This application is a 371 of international application of PCT application serial no. PCT/JP2015/068359, filed on Jun. 25, 2015, which claims the priority benefit of Japan application no. 2014-134086, 2014-134087 and 2014-134088, filed on Jun. 30, 2014. The entirety of each of the above-mentioned patent applications is hereby incorporated by reference herein and made a part of this specification.

TECHNICAL FIELD

The present invention relates to a shoulder-blade incision-making apparatus for separating a shoulder blade of a poultry carcass and a meat portion attached to the shoulder blade, for instance, in a butchering process of a poultry carcass of a fowl such as a chicken.

BACKGROUND ART

In a general process of butchering a poultry carcass of a fowl such as a chicken into a meat portion and a bone portion, butchering and deboning are performed after feather removal, blood draining, and removal of guts and the like (evisceration). Human labor cannot efficiently perform the butchering-and-deboning processes for poultry carcasses, and thus has been taken over by automated processes. For many years, the present applicant has been engaged in development of the automated deboning technologies for poultry carcasses.

In the course of automated butchering-and-deboning processes of an upper body of a poultry carcass, from which legs and guts are removed to leave only the upper body, the poultry carcass is placed and fixed on a fixing jig of a cone shape, which is referred to as "fixing jig", to retain an appropriate posture of the poultry carcass through the entire deboning process, as the poultry carcass is carried through a plurality of processing stations to be butchered and deboned.

The butchering-and-deboning processes include a step of separating a breast-meat portion with a wing from a bone section called "gara (waste bone)". Before separating the breast-meat section, a meat portion is separated from a shoulder blade of a poultry carcass in a shoulder-blade incision-making step.

Patent Document 1 discloses performing a shoulder-blade incision-making step by using a cutting blade mounted to a robot arm of four-axis control.

Furthermore, Patent Document 2 discloses performing a shoulder-blade incision-making step by conveying a poultry carcass fixed to a fixing jig called a carrier along a conveyance path and using a separating member fixed so as to face the conveyance path of the fixing jig.

CITATION LIST

Patent Literature

Patent Document 1: JP2011-125317A
Patent Document 2: JP2013-046632A

SUMMARY

Problems to be Solved

In Patent Document 1, an expensive robot arm is employed and thus the costs may be high. Furthermore, a cutting blade is moved along a complicated cutting path, and thus the processing time becomes longer, which may deteriorate the processing efficiency if a large number of poultry carcasses is to be processed.

In Patent Document 2, a scraper is fixed, and thus the scraper may hit a shoulder joint section joined to a shoulder blade and break the shoulder joint section when a poultry carcass is moved along the conveyance path. Thus, the technique disclosed in Patent Document 2 is not capable of removing only a meat portion attached to a shoulder blade. Besides, fragments of bones of a broken shoulder joint section may get mixed into a meat portion separated from a bone portion, which reduces the value of meat product.

The present invention was made in view of the above issue of the conventional techniques, and an object of the present invention is to provide a shoulder-blade incision-making apparatus for separating a shoulder blade of a poultry carcass and a meat portion attached to the shoulder blade at low cost and a high processing efficiency, without breaking a shoulder joint section, while achieving a high yield of the meat portion to be separated.

Solution to the Problems (1) A shoulder-blade incision-making apparatus, according to at least one embodiment of the present invention, for separating a meat portion attached to a shoulder-blade of a poultry carcass from the shoulder-blade, comprises: a fixing jig on which the poultry carcass which is eviscerated and which has leg parts removed is to be placed and fixed; a conveyer forming a conveyance path of the fixing jig and configured to convey the fixing jig along the conveyance path; a first separating member disposed above the conveyance path movably upward and downward; and a first driving device for moving the first separating member in an upward and downward direction. The first driving device is operated to move downward the first separating member and move the first separating member along a surface of the shoulder-blade of the poultry carcass in accordance with a timing when the poultry carcass fixed to the fixing jig reaches a meat-separation position below the first separating member so that the meat portion attached to the shoulder-blade is separated from the shoulder blade.

With the above configuration (1), the first separating member is moved downward toward the surface of the shoulder blade in accordance with the timing when the poultry carcass reaches the meat-separation position below the first separating member, and thereby it is possible to separate a meat portion from the shoulder blade while avoiding cutting a shoulder joint section.

Moreover, with the above configuration (1), incision making on a shoulder blade can be automated, and thereby the processing efficiency improves.

(2) In some embodiments, in the above configuration (1), the first separating member includes a pair of scraper members disposed on opposite sides of a center line extending along the conveyance path and passing through a center of the fixing jig, across the centerline. The pair of scraper members are oriented so that a distance between the scraper members gradually decreases toward a downstream side in a conveying direction of the poultry carcass.

With the above configuration (1), the pair of scraper members can be located in accordance with the position and the direction of the shoulder blade of the poultry carcass, and thus it is possible to make the pair of scraper members follow the surface of the shoulder blade reliably in incision making. Accordingly, it is possible to improve a yield of a meat portion after separation.

(3) In some embodiments, in the above configuration (1) or (2), the shoulder-blade incision-making apparatus further comprises: a second separating member disposed above the conveyance path and at an upstream side of the first separating member in a conveying direction of the fixing jig; and a second driving device for moving the second separating member in an upward and downward direction. The second driving device is operated to move downward the second separating member in accordance with a timing when the poultry carcass fixed to the fixing jig reaches a meat-separation position below the second separating member, to separate a meat portion attached to a collar bone of the poultry carcass.

With the above configuration (3), a meat portion attached to the collar bone is separated from the collar bone before the step of separating a meat portion from the shoulder blade, and thereby a meat portion can be readily separated from the shoulder blade.

(4) In some embodiments, in any one of the above configurations (1) to (3), the shoulder-blade incision-making apparatus further comprises a synchronizing device which includes: a conveying-distance detection part for detecting a conveying distance from a reference point of the conveyer; and a control device for determining a timing to move downward the first separating member and the second separating member from a detection value detected by the conveying-distance detection part, and operating the first driving device and the second driving device to move downward the first separating member and the second separating member.

With the above configuration (4), it is possible to detect a moving distance of each fixing jig from the reference point (e.g. a starting side) of the conveyor with the conveying-distance detection part, and thereby it is possible to correctly determine the timing to move downward the first separating member and the second separating member on the basis of the detection value. In this way, it is possible to separate a meat portion from the shoulder blade and the collar bone reliably.

(5) In some embodiments, in the above configuration (4), the shoulder-blade incision-making apparatus further comprises a contour measurement part which includes: a contact element disposed in the conveyance path at an upstream side of the second separating member in the conveying direction of the fixing jig; an elastic support part for elastically supporting the contact element so that the contact element follows a surface of a shoulder section of the poultry carcass; and a contour calculation part into which positional information of the contact element at a time when the contact element is in contact with the poultry carcass is to be inputted and which is configured to calculate a contour shape of the poultry carcass from the positional information. The controller is configured to determine the timing to move downward the first separating member and the second separating member from the detection value detected by the conveying-distance detection part and the contour shape of the poultry carcass obtained by the contour measurement part.

In addition to the detection value of the conveying-distance detection part, the contour shape of the poultry carcass detected by the contour measurement part is used to determine the timing to move downward the first separating member and the second separating member, and thereby it is possible to set the timing to move downward the separating members in accordance with the contour shape including the size of each poultry carcass.

(6) In some embodiments, in any one of the above configurations (3) to (5), the first separating member and the second separating member are supported on a single support base movably upward and downward.

With the above configuration (6), the first separating member and the second separating member can be supported by the single support base, and thus it is possible to reduce the costs for supporting the support parts of the first separating member and the second separating member. Furthermore, with this configuration, the first separating member and the second separating member move together, and thus control of the separating members is facilitated. Thus, it is possible to simplify the configuration and reduce the costs for the synchronizing device and the controller.

(7) In some embodiments, in any one of the above configurations (3) to (5), the shoulder-blade incision-making apparatus further comprises: a first support base for supporting the first separating member movably upward and downward; a second support base for supporting the second separating member movably upward and downward; and a moving part which enables variation of a distance between the first support base and the second support base in the conveying direction of the fixing jig.

With the above configuration (7), the distance between the first and second support bases in the conveying direction is changed in accordance with the conveying speed and conveying interval of the fixing jigs, as well as the contour shape of the poultry carcass, and thereby handling of incision making is facilitated.

(8) In some embodiments, in any one of the above configurations (1) to (7), the elastic support part comprises an air cylinder interposed between the first separating member and a support member supporting the first separating member.

With the above configuration (8), an elastic force applied to the poultry carcass by the first separating member can be adjusted even during operation of the incision-making apparatus, and thereby an appropriate elastic force can be exerted in accordance with the size (individual difference) of the poultry carcass being conveyed.

(9) In some embodiments, in any one of the above configurations (1) to (7), the elastic support part comprises a spring member interposed between the first separating member and a support member supporting the first separating member.

With the above configuration (9), it is possible to simplify the configuration and reduce the costs for the elastic support part.

Advantageous Effects

According to at least one embodiment of the present invention, it is possible to make an incision on a shoulder blade with a high processing efficiency, without breaking a shoulder joint section, while achieving a high yield of a meat portion to be separated and an improved processing efficiency.

DETAILED DESCRIPTION

With reference the accompanied drawings, some embodiments of the present embodiments will be described. It is intended, however, that unless particularly specified, dimensions, materials, shapes, relative positions and the like of components described in the embodiments or illustrated in the drawings shall be interpreted as illustrative only and not limitative of the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

A shoulder-blade incision-making apparatus according to some embodiments of the present invention will now be described with reference to FIGS. 1 to 10. A shoulder-blade incision-making apparatus 10 includes a chain conveyor 12 of an endless shape disposed in a horizontal direction. The chain conveyor 12 is wound around a driving sprocket 14 at the front side, and the driving sprocket 14 is driven by a motor 16. In the drawing, the chain conveyor 12 moves in the direction of arrow "a" during forward movement. The chain conveyor 12 of an endless shape is wound around a driven sprocket (not depicted) at the rear side.

The chain conveyor 12 is provided with a plurality of fixing jigs 20 referred to as "cones" arranged at regular intervals. In the depicted embodiment, the upper half of the fixing jig 20 has a conical shape and is erected in a direction perpendicular to the chain conveyor 12, and is configured to be capable of tilting when necessary during conveyance.

The chain conveyor 12 forms a conveyance path of the fixing jigs 20, and the fixing jigs 20 are carried along the conveyance path.

A poultry carcass w (hereinafter, referred to as a "workpiece") of a fowl such as a chicken having its legs and guts removed to leave only the upper body in pretreatment processes is placed and fixed on each of the fixing jigs 20 by a worker at the front side of the chain conveyor 12. The workpiece w is placed on the fixing jig 20 with a breast section facing an upstream side or a downstream side in the conveying direction (in the depicted embodiment, the downstream side in the conveying direction).

In an exemplary embodiment, provided is a conveying-distance detection part for detecting a conveying distance of the fixing jigs 20 from a reference point of the chain conveyor 12.

The conveying-distance detection part includes an encoder 18 disposed on the motor 16 and configured to detect a cumulative rotation number of the motor 16. By measuring the cumulative rotation number of the motor 16 with the encoder 18, it is possible to detect an amount of movement (conveying distance) of each fixing jig 20 from the position of the motor, while using the position of the motor as the reference point.

Figure 1:
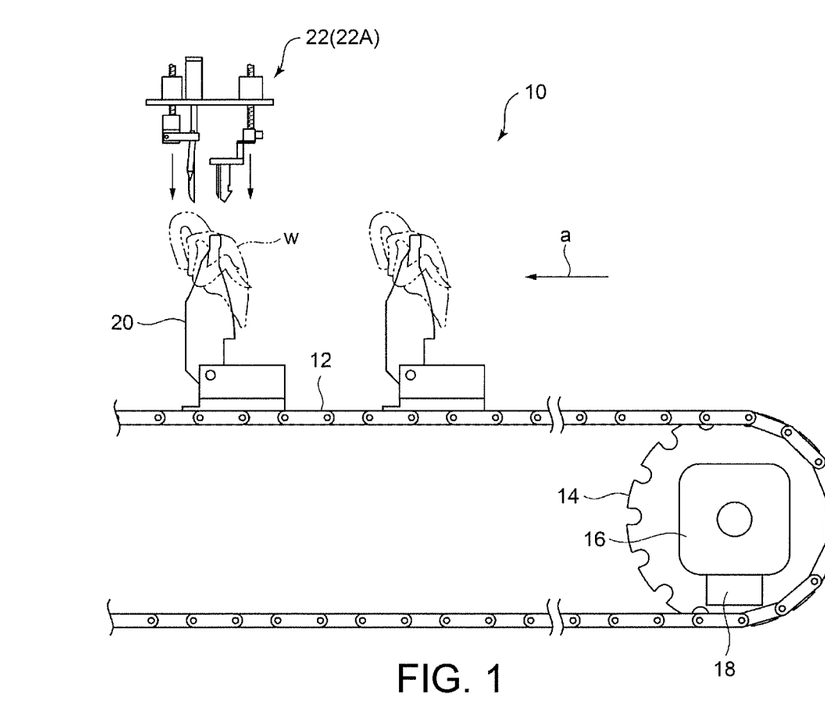
FIG. 1 is an overall schematic diagram of a shoulder-blade incision-making apparatus according to an embodiment.
Figure 2:
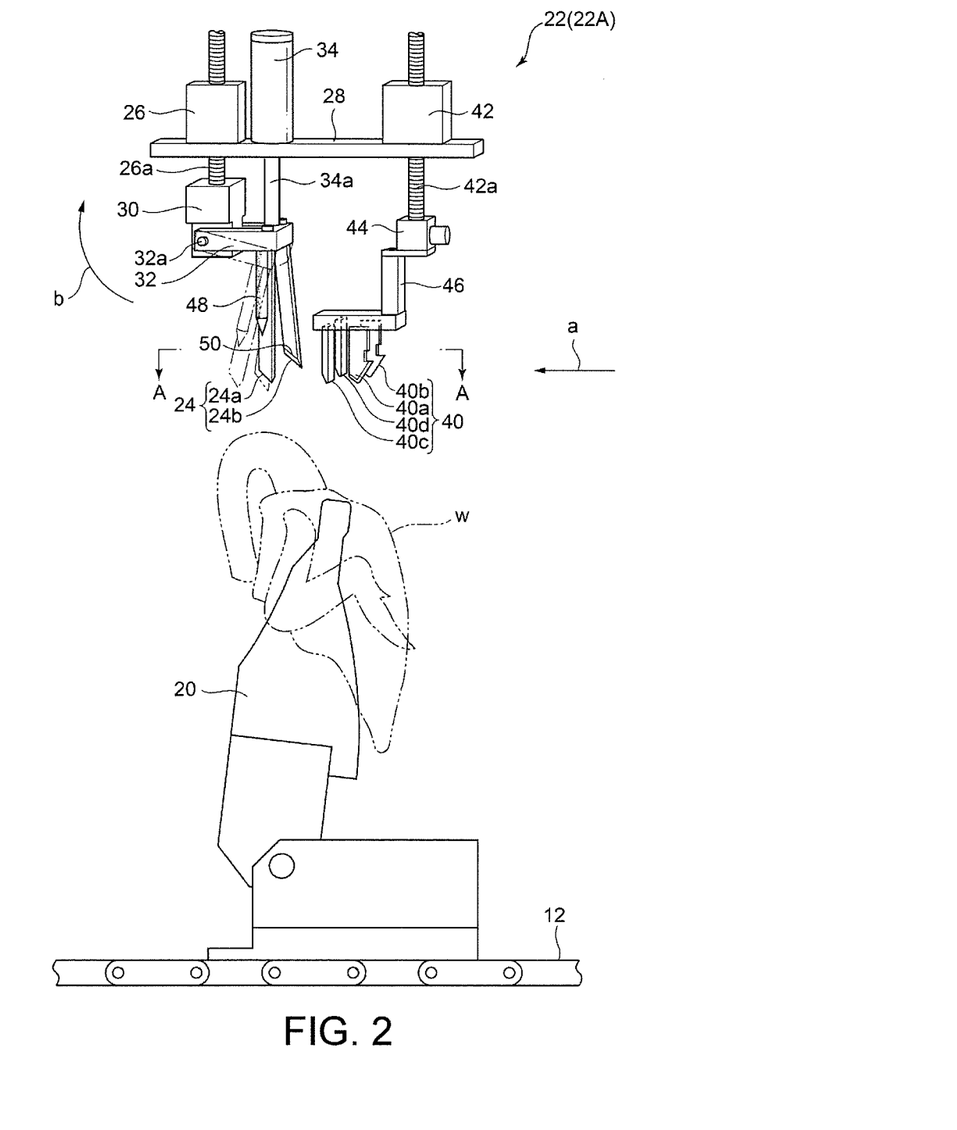
FIG. 2 is a perspective view of a shoulder-blade incision-making part according to an embodiment.
Figure 8:
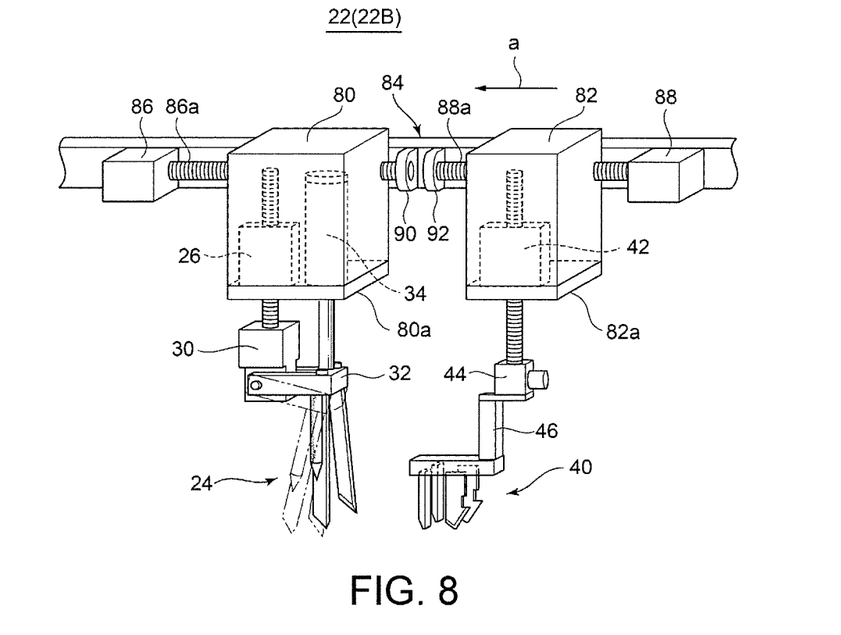
FIG. 8 is a perspective view of a shoulder-blade incision-making part according to an embodiment.
Figure 10:
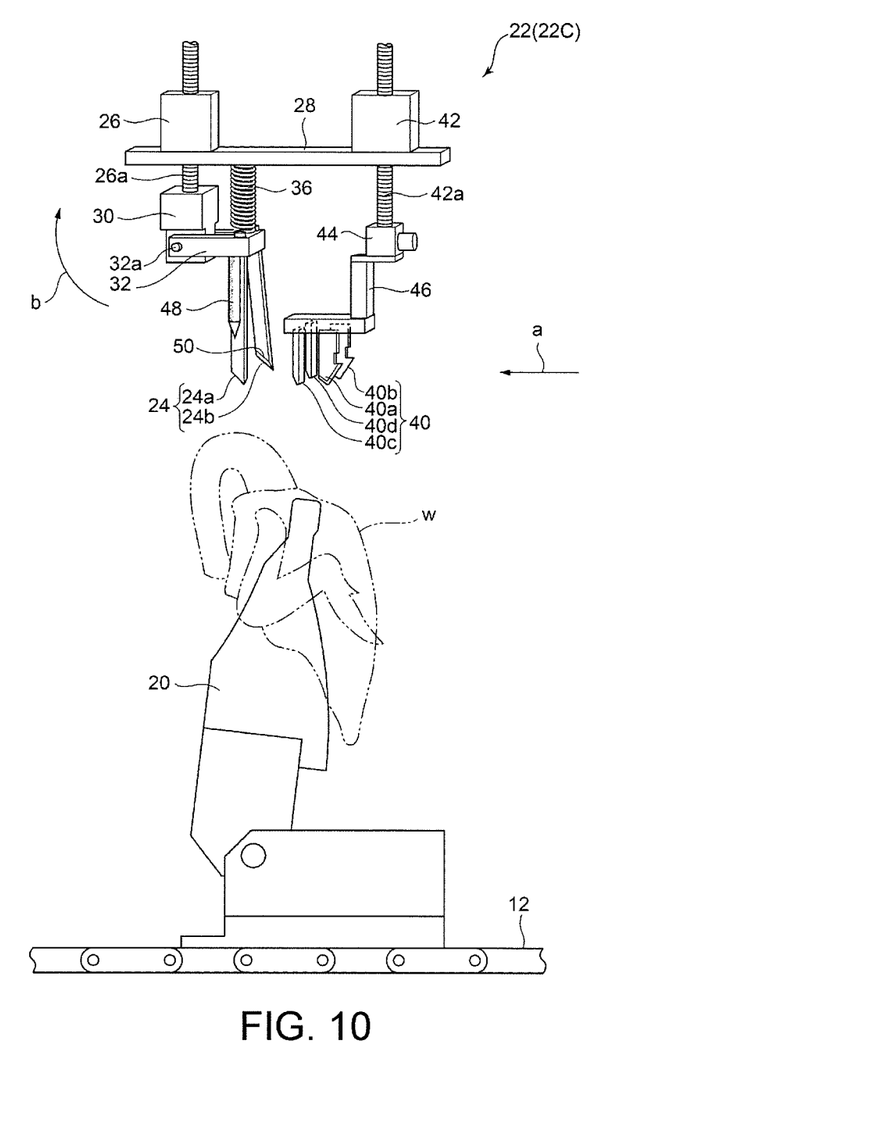
FIG. 10 is a perspective view of a shoulder-blade incision-making apparatus according to an embodiment.

In some embodiments, as depicted in FIGS. 2, 8, and 10, an incision-making part 22 (22A, 22B, 22C) is disposed above the chain conveyor 12.

The incision-making part 22 includes a first separating member 24 disposed above the chain conveyor 12 movably upward and downward, and a driving device (first driving device) for moving the first separating member 24 in an upward and downward direction.

The driving device includes, for instance, a servomotor 26 supported on a support base 28, as depicted in FIG. 2. The servomotor 26 rotates a screw shaft 26a inserted through the support base 36 in a vertical direction. The screw shaft 26a is provided with a movable block 30 that is slidable on the screw shaft 26a in response to rotation of the screw shaft 26a. A bracket 32 has an end mounted rotatably to the movable block 30 via a shaft 32a, and the first separating member 24 is suspended from the other end of the bracket 32.

In an exemplary configuration, the incision-making part 22 includes an elastic support part that supports the first separating member 24 elastically so that the first separating member 24 is capable of receding toward the downstream side of a workpiece w in the conveying direction.

In the case of the incision-making part 22 (22A, 22B) depicted in FIGS. 2 and 8, the elastic support part includes an air cylinder 34 fixed to the support base 28. The air cylinder 34 has a piston rod 34a inserted through the support base 28 and extending downward to be coupled to an end portion of the bracket 32 at the side where the first separating member 24 is fixed.

In the case of the incision-making part 22 (22C) depicted in FIG. 10, the elastic support part includes a coil spring 36 interposed between the support base 28 and the bracket 32.

Furthermore, the incision-making part 22 is configured to operate the servomotor 26 to lower the first separating member 24 and move the first separating member 24 along a surface of a shoulder blade of a workpiece w fixed to the fixing jig 20, in accordance with the timing when the workpiece w reaches a meat-separation position below the first separating member. In an exemplary embodiment, a synchronizing device is provided which enables such operation of the first separating member 24.

With this configuration, the incision-making part 22 separates a meat portion attached to the shoulder blade of the workpiece w at the meat-separation position.

In an exemplary embodiment, the first separating member 24 includes a pair of scraper members 24a and 24b disposed on either side of the center line C (see FIG. 3) passing through the center of the fixing jig 20, across the center line C, along the conveyance path of the fixing jig 20 formed by the chain conveyor 12. The scraper members 24a and 24b have an elongated plate shape, for instance, and oriented so that a distance between the scraper members 24a and 24b gradually reduces toward the downstream side in the conveying direction of the workpiece w.

When the scraper members 24a and 24b having such a shape move downward, the scraper members 24a and 24b contact the surface of the shoulder blade of the workpiece w, and thereby it is possible to separate a meat portion attached to the surface of the shoulder blade from the shoulder blade with a high yield.

In an exemplary embodiment, the incision-making part 22 includes a second separating member 40 disposed above the chain conveyor 12 at the upstream side of the first separating member 24 in the conveying direction, and a driving device (second driving device) for moving the second separating member 40 in an upward and downward direction. The second driving device includes, for instance, a servomotor 42.

Furthermore, the incision-making part 22 includes a synchronizing device which operates the servomotor 42 to lower the second separating member 40 in accordance with the timing when the workpiece w fixed to the fixing jig 20 reaches a meat-separation position below the second separating member.

With this configuration, the second separating member 40 is moved downward toward the workpiece w at the meat-separation position, and separates a meat portion attached to a collar bone.

The synchronizing device includes, for instance as depicted in FIG. 2, the servomotor 42 supported on the support base 28.

In the depicted embodiment, as depicted in FIG. 2, the servomotor 42 rotates a screw shaft 42a inserted through the support base 28 in the vertical direction. The screw shaft 42a is provided with a movable block 44 that is slidable on the screw shaft 42a in response to rotation of the screw shaft 42a. An L-shaped block 46 is joined to a lower surface of the movable block 44, and the second separating member 40 is suspended from the L-shaped block 46.

Figure 3:
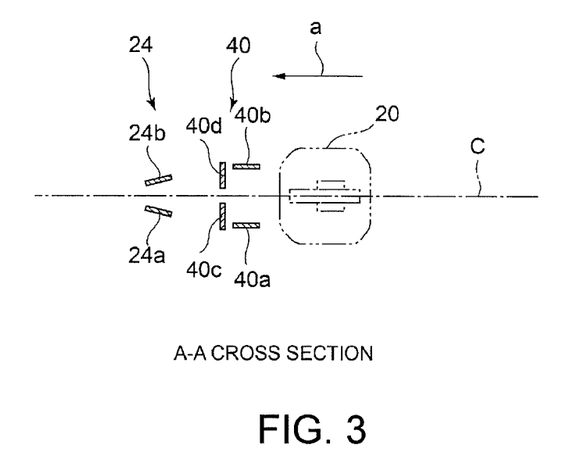
FIG. 3 is a cross-sectional view taken along line A-A in FIG. 2.

In the embodiment depicted in FIGS. 2 and 3, the second separating member 40 includes scraper members 40a, 40b, 40c, and 40d. A pair of scraper members 40a and 40b disposed upstream in the conveying direction is arranged parallel to the center line C and symmetric with respect to the center line C, while a pair of scraper members 40c and 40d disposed downstream in the conveying direction is arranged to form a right angle with the center line C and symmetric with respect to the center line C.

With this configuration, the scraper members 40a to 40d enter both of the outer sides of the collar bone of the workpiece w, and thereby it is possible to separate a meat portion attached to the collar bone.

In the depicted embodiment, as depicted in FIG. 2, the scraper members 24a, 24b, 40a to 40d are fondled into a flat elongated-plate shape, and suspended downward from the bracket 32 or the L-shaped block 46. Furthermore, a reinforcing rod 48 is disposed adjacent to the pair of scraper members 24a and 24b. The scraper members 24a and 24b are formed into a pointed shape at a tip end, and the side of the tip end forms a single-edge blade with a ridge 50 (where the blade surface starts to incline toward the edge) formed on a surface facing the other scraper member.

Figure 4:
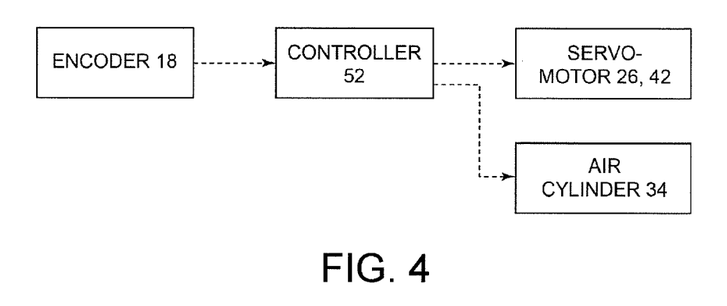
FIG. 4 is a block diagram of a control system of a shoulder-blade incision-making part according to an embodiment.

In an exemplary embodiment, as depicted in FIG. 4, the synchronizing device includes an encoder 18 (conveying-distance detection part) for detecting an amount of movement (conveying distance) of each fixing jig 20 from a reference point (position of the motor 16) of the chain conveyor 12, and a controller 52 to which a detection value of the encoder 18 is to be inputted.

The above described synchronizing device determines a timing to lower the first separating member 24 with the controller 52, on the basis of a detection value detected by the encoder 18, and operates the servomotor 26 to lower the first separating member 24. The incision-making part 22 (22A, 22B) operates the air cylinder 34 simultaneously with the first separating member 24, and lowers the bracket 32 while maintaining the bracket 32 in a horizontal attitude. Accordingly, it is possible to lower the scraper members 24a and 24b constituting the first separating member 24 while maintaining the scraper members 24a and 24b in the perpendicular direction.

The above described synchronizing device determines a timing to lower the second separating member 40 with the controller 52, from a detection value detected by the encoder 18, and operates the servomotor 42 to lower the second separating member 24.

Figure 5:
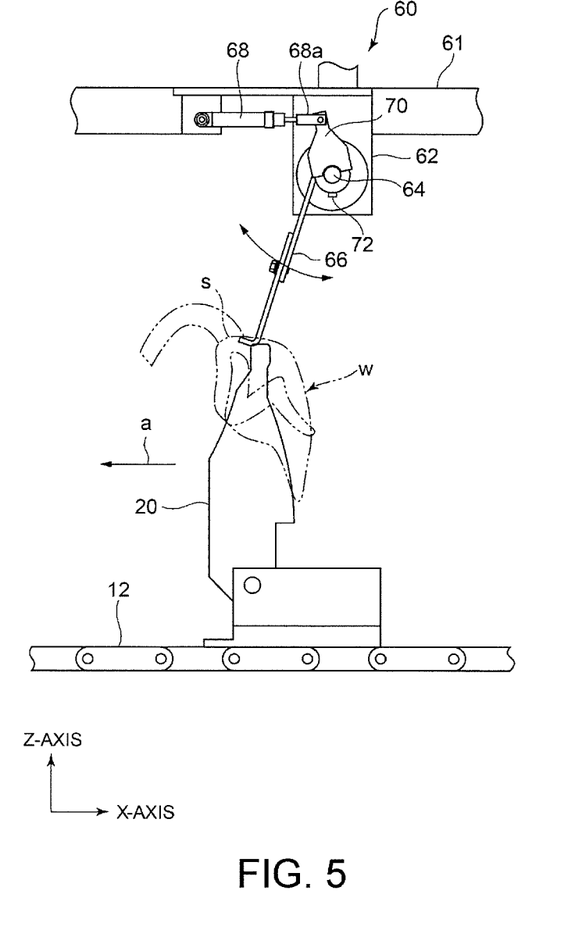
FIG. 5 is a front view of a contour measurement part according to an embodiment.
Figure 6:
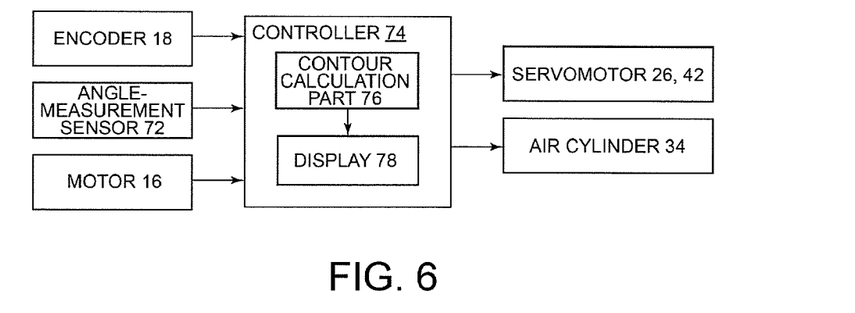
FIG. 6 is a block diagram of a control system of a shoulder-blade incision-making part according to an embodiment.

In an exemplary embodiment, as depicted in FIGS. 5 and 6, a contour measurement part 60 for measuring a contour shape of the workpiece w is disposed above the chain conveyor 12 at an upstream side of the incision-making part 22 in the conveying direction.

The contour measurement part 60 includes a contact element 66 disposed above the conveyance path, an elastic support part for elastically supporting the contact element 66 so that the contact element 66 follows the surface of a shoulder section of the workpiece w, and a contour calculation part 76 to which positional information of the contact element 66 in contact with the workpiece w is to be inputted. The contour calculation part 76 is housed inside a controller 74, and calculates a contour shape of the workpiece w from the inputted positional information of the contact element 66.

The controller 74 determines a timing to lower the second separating member 24 or the second separating member 40 on the basis of a detection value detected by the encoder 18 and a contour shape of the workpiece w obtained by the contour measurement part 60.

In the depicted embodiment, as depicted in FIG. 5, a measurement block 62 is mounted to a support frame 61 disposed above the conveyance path of the fixing jigs 20. The measurement block 62 supports a support shaft 64 revolvably, and an end of a contact bar 66 having a bar shape is coupled to the support shaft 64. The contact bar 66 is supported pivotally about the support shaft 64.

The measurement block 62 includes an air cylinder 68 that serves as the elastic support part, and the air cylinder 68 includes a piston rod 68a connected to the support shaft 64 via an arm 70. The other end of the contact bar 66 is positioned so as to be in contact with a shoulder section "s" of the workpiece w moving in along the conveyance path of the fixing jig 20. When the contact bar 66 comes into contact with the shoulder section s of the workpiece w, a biasing force (elastic force) of the air cylinder 68 is applied to the contact bar 66, which makes it possible for the contact bar 66 to follow the surface of the shoulder section s. The support shaft 64 is provided with an angle-measurement sensor 72 for measuring a rotational angle of the support shaft 64.

FIG. 6 is a diagram of the control system of the present embodiment. In FIG. 6, the controller 74 controls the motor 16 to control a conveyance speed of the fixing jigs 20. A measurement signal of the angle-measurement sensor 72 is inputted into the contour calculation part 76 of the controller 74. The contour calculation part 76 calculates a contact position at which the contact bar 66 is in contact with the workpiece w from the length of the contact bar 66 in the axial direction, and an angle formed between a reference line and the contact bar 66, by using polar coordinates. The calculated value is combined with the positional information of the fixing jig 20 inputted from the encoder 18, and thereby a contour shape (profile) is obtained.

The incision-making part 22 includes a display part (not depicted) for showing the accordingly obtained contour shape of the workpiece w. The display part includes a display 78 for showing the contour shape of the workpiece w.

Figure 7:
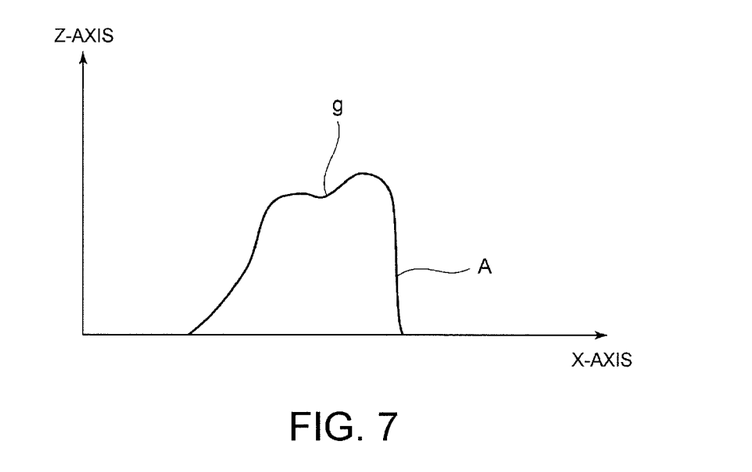
FIG. 7 is a diagram of a contour shape of a poultry carcass measured by the contour measurement part.

FIG. 7 is a diagram shown by the display 78. In FIG. 7, line A is the contour shape of the shoulder section s of the workpiece w measured with the contact bar 66. In the drawing, X-axis is a coordinate axis in the direction of arrow a (conveying direction), and Z-axis is a coordinate axis in the vertical direction. In the drawing, for instance, even if the contour shape of the workpiece w has a recessed portion g, it is possible to display the contour shape (profile) clearly on the display 78.

The encoder 18, the contour measurement part 60, and the controller 74 constitute the synchronizing device for determining a timing to move downward the first separating member 24 and the second separating member 40.

In this embodiment, in addition to the positional information of each fixing jig 20 inputted into the controller 74 from the encoder 18, a timing to move downward the first separating member 24 and the second separating member 40 is determined on the basis of the contour-shape profile shown on the display 78.

In an exemplary embodiment, as depicted in FIG. 2, the first separating member 24 and the second separating member 40 are supported on the single support base 28 movably upward and downward.

The incision-making part 22 (22B) depicted in FIG. 8 includes a first support block 80 for supporting the second separating member 24 movably upward and downward, a second support block 82 for supporting the second separating member 40 movably upward and downward, and a moving part 84 for enabling variation of the distance between the first support block 80 and the second support block 82 in the conveying direction of the fixing jigs 20.

In this embodiment, servomotors 86 and 88 are operated to rotate screw shafts 86a and 88b, and thereby it is possible to enable variation of the distance between the first support block 80 and the second support block 82 in the conveying direction.

In an exemplary configuration depicted in FIG. 8, the moving part 84 includes a support frame 86, the servomotors 86 and 88 fixed to the support frame 86, the screw shafts 86a and 88a revolved by the servomotors 86 and 88, and bearings 90 and 92 supporting the other ends of the screw shafts 86a and 88a. The support frame 86 is disposed above the conveyance path in the horizontal direction and along the conveyance path, while the screw shafts 86a and 88a are disposed in series along the support frame 86.

Similarly to the incision-making part 22 (22A) depicted in FIG. 2, the servomotor 26 and the air cylinder 34 are fixed to a support plate 80a constituting a bottom wall of the first support block 80, while the movable block 30, the bracket 32, and the first separating member 24 are mounted to the screw shaft 26a and the piston rod 34a.

Furthermore, the servomotor 42 is fixed to a support plate 82a constituting a bottom wall of the second support block 82, while the second separating member 40 is mounted to the screw shaft 42a via the movable block 44 and the L-shaped block 46, similarly to the incision-making part 22 (22A) depicted in FIG. 2.

Figure 9:
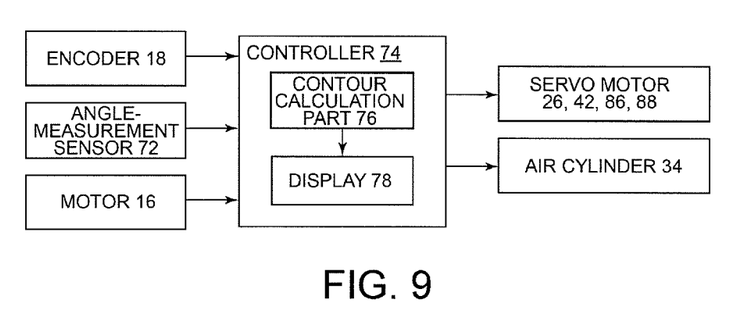
FIG. 9 is a block diagram of a control system of a shoulder-blade incision-making part according to an embodiment.

FIG. 9 is a diagram of the control system of the incision-making part 22 (22B). The controller 74 controls the servomotors 86 and 88 disposed on the moving part 84, on the basis of the contour-shape profile of the workpiece w shown on the display 78, and adjusts the distance between the first support block 80 and the second support block 82.

In an exemplary embodiment, the elastic support part elastically supporting the first separating member 24 includes the air cylinder 34 fixed to the support base 28, as in the incision-making part 22 (22A, 22B) depicted in FIGS. 2 and 8.

In an exemplary embodiment, the elastic support part includes the coil spring 36 interposed between the support base 28 and the bracket 32, as in the incision-making part 22 (22C) depicted in FIG. 10.

In some embodiments, the synchronizing device moves downward the first separating member 24 in accordance with the timing when the workpiece w reaches the meat-separation position below the first separating member 24, and thereby the first separating member 24 can separate a meat portion from a shoulder blade while avoiding cutting a shoulder joint section.

Furthermore, the first separating member 24 is elastically supported by the elastic support part, and thus the first separating member 24 can escape downstream in the conveying direction (direction of arrow b) in case a reaction force of a predetermined level or more acts on the first separating member 24 from the workpiece w. Therefore, the first separating member 24 does not apply an excessive force to the workpiece w, and thereby it is possible to prevent breakage of a bone portion or the like of the workpiece w, and to make the first separating member 24 follow the surface of the workpiece w, which makes it possible to improve a yield of a meat portion after separation.

Furthermore, a shoulder incision-making step can be automated with the incision-making part 22, and thereby it is possible to improve the processing efficiency.

Moreover, the first separating member 24 includes the pair of scraper members 24a and 24b arranged on either side of the center line C symmetrically with respect to the center line C, and oriented so that the distance therebetween gradually reduces downstream in the conveying direction, and thereby it is possible to make the scraper members 24a and 24b follow the surface of a shoulder blade reliably. Accordingly, it is possible to improve a yield of a meat portion after separation.

Furthermore, the second separating member 40 is disposed upstream of the first separating member 24 in the conveying direction, and thereby it is possible to separate a meat portion attached to a collar bone from the collar bone before the step of separating a meat portion from a shoulder blade, which facilitates separation of a meat portion from a shoulder blade.

Furthermore, a conveying distance of each fixing jig 20 from the reference point of the chain conveyor 12 is detected with the encoder 18, and a timing to lower the first separating member 24 and the second separating member 40 is determined on the basis of the positional information, which makes it possible to separate a meat portion from a shoulder blade and a collar bone reliably.

Furthermore, in an exemplary embodiment, as depicted in FIGS. 5 and 6, the contour measurement part 60 makes the contact element 66 disposed upstream of the incision-making part 22 in the conveying direction contact the workpiece w, and the contour calculation part 76 of the controller 74 calculates the contour shape of the workpiece w on the basis of the positional information of the contact element 66 at the time of contact, in addition to the positional information of the encoder 18, and thereby it is possible to determine a timing to lower the first separating member 24 and the second separating member 40 accurately. Accordingly, it is possible to separate a meat portion from a collar bone and a shoulder blade with a high yield, and to insert the scraper members into desired positions on the workpiece w to prevent breakage of a shoulder joint section.

Furthermore, the contact element 66 is elastically supported so as to follow the surface of a shoulder section of the workpiece w, and thereby it is possible to make the contact element 66 follow the surface of the shoulder section of the workpiece w reliably.

Furthermore, for the incision-making part 22 (22B) depicted in FIG. 2, the first separating member 24 and the second separating member 40 are supported by the single support base 28, and thus it is possible to reduce the costs for supporting the separating members. Also, with this configuration, the first separating member 24 and the second separating member 40 move together, and thus it is possible to facilitate control of the separating members. Thus, it is possible to simplify the configuration and reduce the costs for the synchronizing device and the controller 52 or 74.

Furthermore, for the incision-making part 22 (22C) depicted in FIGS. 8 and 9, the second separating member 24 and the second separating member 40 are supported on the first support base 80 and the second support base 82, separately and respectively, and the distance between the first support base 80 and the second support base 82 in the conveying direction can be adjusted by the moving part 84, and thereby it is possible to adjust the distance to an optimum distance whereby incision can be made readily in accordance with the conveying speed and the interval of the fixing jigs 20 in the conveying direction, as well as the size and contour shape of each workpiece.

Furthermore, for the incision-making part 22 (22A) depicted in FIG. 2, the second separating member 24 is supported by the air cylinder 34 elastically, and thereby it is possible to adjust an elastic force that is applied to the workpiece w from the second separating member 24 during operation of the incision-making apparatus. Accordingly, it is possible to apply an appropriate elastic force in accordance with the size (individual variability) of the workpiece w, which is a poultry carcass, even during operation.

Furthermore, for the incision-making part 22 (22C) depicted in FIG. 10, the second separating member 24 is elastically supported by the coil spring 36, and thereby it is possible to simplify the configuration and reduce the costs for the elastic support part.

INDUSTRIAL APPLICABILITY

According to the present invention, it is possible to provide a shoulder-blade incision-making apparatus for a poultry carcass at low cost, without breaking a shoulder joint section, while achieving an improved processing efficiency and an improve yield of a meat portion.

The invention claimed is:

1. A shoulder-blade incision-making apparatus for separating a meat portion attached to a shoulder-blade of a poultry carcass from the shoulder-blade, comprising:
    a fixing jig on which the poultry carcass which is eviscerated and which has leg parts removed is to be placed and fixed;
    a conveyer forming a conveyance path of the fixing jig and configured to convey the fixing jig along the conveyance path;
    a first separating member disposed above the conveyance path movably upward and downward; and
    a first driving device for moving the first separating member in an upward and downward direction,
    wherein the first driving device is operated to move downward the first separating member and move the first separating member along a surface of the shoulder-blade of the poultry carcass in accordance with a timing when the poultry carcass fixed to the fixing jig reaches a meat-separation position below the first separating member so that the meat portion attached to the shoulder-blade is separated from the shoulder blade,
    wherein the first separating member includes a pair of scraper members disposed on opposite sides of a center line extending along the conveyance path and passing through a center of the fixing jig, across the centerline, and
    wherein the pair of scraper members are oriented so that a distance between the scraper members gradually decreases toward a downstream side in a conveying direction of the poultry carcass.

2. The shoulder-blade incision-making apparatus according to claim 1, further comprising:
    a second separating member disposed above the conveyance path and at an upstream side of the first separating member in a conveying direction of the fixing jig; and
    a second driving device for moving the second separating member in an upward and downward direction,
    wherein the second driving device is operated to move downward the second separating member in accordance with a timing when the poultry carcass fixed to the fixing jig reaches a meat-separation position below the second separating member, to separate a meat portion attached to a collar bone of the poultry carcass.

3. The shoulder-blade incision-making apparatus according to claim 2, further comprising:
    a synchronizing device which includes:
        a conveying-distance detection part for detecting a conveying distance of the fixing jig from a reference point of the conveyer; and
        a control device for determining a timing to move downward the first separating member and the second separating member from a detection value detected by the conveying-distance detection part, and operating the first driving device and the second driving device to move downward the first separating member and the second separating member.

4. The shoulder-blade incision-making apparatus according to claim 3, further comprising:
    a contour measurement part which includes:
        a contact element disposed in the conveyance path at an upstream side of the second separating member in the conveying direction of the fixing jig;

an elastic support part for elastically supporting the contact element so that the contact element follows a surface of a shoulder section of the poultry carcass; and a contour calculation part into which positional information of the contact element at a time when the contact element is in contact with the poultry carcass is to be inputted and which is configured to calculate a contour shape of the poultry carcass from the positional information, wherein the controller is configured to determine the timing to move downward the first separating member and the second separating member from the detection value detected by the conveying-distance detection part and the contour shape of the poultry carcass obtained by the contour measurement part.

5. The shoulder-blade incision-making apparatus according to claim 4, wherein
the elastic support part comprises an air cylinder interposed between the first separating member and a support member supporting the first separating member.

6. The shoulder-blade incision-making apparatus according to claim 4, wherein
the elastic support part comprises a spring member interposed between the first separating member and a support member supporting the first separating member.

7. The shoulder-blade incision-making apparatus according to claim 2, wherein
the first separating member and the second separating member are supported on a single support base movably upward and downward.

8. The shoulder-blade incision-making apparatus according to claim 2, further comprising:
a first support base for supporting the first separating member movably upward and downward;
a second support base for supporting the second separating member movably upward and downward; and
a moving part which enables variation of a distance between the first support base and the second support base in the conveying direction of the fixing jig.

* * * * *